(12) United States Patent
Hart (10) Patent No.: US 7,610,744 B2
(45) Date of Patent: Nov. 3, 2009

(54) CABLE/HOSE HAULAGE CHAIN (75) Inventor: Anthony John Hart, Nottingham (GB)

(73) Assignee: Mansign Mining Equipment Limited, Nottingham (GB)

( * ) Notice: Subject to any disclaimer, the term of this patent is extended or adjusted under 35 U.S.C. 154(b) by 0 days.

(21) Appl. No.: 12/101,507

(22) Filed: Apr. 11, 2008

(65) Prior Publication Data
US 2008/0302080 A1 Dec. 11, 2008

(51) Int. Cl.
F16G 13/16 (2006.01)
(52) U.S. Cl. ............................. 59/78.1; 59/900; 248/49; 248/51
(58) Field of Classification Search .................. 59/78.1, 59/900; 248/49, 51
See application file for complete search history.

(56) References Cited

U.S. PATENT DOCUMENTS

| 3,772,875 | A | | 11/1973 | Viano | |
|---|---|---|---|---|---|
| 4,263,779 | A | * | 4/1981 | Petershack | 59/8 |
| 4,852,342 | A | * | 8/1989 | Hart | 59/78.1 |
| 5,269,129 | A | * | 12/1993 | Lundy | 59/78 |
| 5,778,656 | A | * | 7/1998 | Hart | 59/78.1 |
| 5,966,923 | A | * | 10/1999 | Nakamura | 59/78 |
| 6,029,437 | A | | 2/2000 | Hart | |
| 6,067,788 | A | | 5/2000 | Weber | |
| 7,441,397 | B2 | * | 10/2008 | Hart | 59/78.1 |
| 7,451,589 | B2 | * | 11/2008 | Howard | 59/78.1 |

FOREIGN PATENT DOCUMENTS

| DE | 93 18 441 | 3/1994 |
|---|---|---|
| GB | 1 073 438 | 6/1967 |
| GB | 1 087 593 | 10/1967 |
| GB | 1 149 341 | 4/1969 |
| GB | 1 589 879 | 5/1981 |
| GB | 2 402 195 | 12/2004 |
| WO | 01/29448 | 4/2001 |
| WO | 2004/106773 | 12/2004 |

OTHER PUBLICATIONS

International Search Report for WO 2004/106773, Sep. 6, 2004.

* cited by examiner

Primary Examiner—David B Jones
(74) Attorney, Agent, or Firm—Renner, Otto, Boisselle & Sklar, LLP (57) ABSTRACT A housing module (10) for a haulage chain capable of hauling cables and hoses. The housing module (10) comprises a pair of opposed housing members (12,14) side wall portions of which abut to define opposed side walls (16,18) extending between opposed first and second walls (20,22). The housing module (10) includes releasable retention members (24) to retain the side wall portions of the housing members (12,14) in abutment whilst allowing selective separation of the housing members (12,14) to permit the loading and removal of cables and hoses into and out of a hollow interior (26) bounded by the walls (16,18,20,22) of the housing module (10). The side wall portions on each side of the housing module (10) define pockets (28) openable on separation of the housing members (12,14) to receive mutually interengaged endless links (44) of a chain (42) and thereby permit use of a pair of such chains (42) to interconnect a succession of housing modules (10) to define a haulage chain. The pockets (28) are closeable and the chains (42) are clampingly retained within the side walls (16,18) of the housing modules (10) on opposite sides of the haulage chain following closure of the respective pockets (28).

19 Claims, 5 Drawing Sheets

CABLE/HOSE HAULAGE CHAIN

The invention relates to a housing module for a haulage chain capable of hauling cables and hoses and, in particular, to a housing module for a haulage chain suitable for use in a mine.

Haulage chains are commonly used in mines to hold cables and hoses extending from fixed supply points to mobile machines such as coal cutting machines.

A haulage chain retains cables and hoses in a disciplined manner and enables the cables and hoses to be pulled behind a coal cutting machine, for example, as it traverses a coal face. The haulage chain thereby reduces tensile forces on the cables and hoses and reduces undesirable stretching thereof.

A haulage chain also protects cables and hoses from damage that might otherwise occur through snagging of the cables and hoses on obstacles, and friction between the cables and hoses and the mine floor and other static surfaces as the cables and hoses follow the machine.

Haulage chains are typically constructed from a succession of modules pivotally connected to one another to permit bending of the haulage chains as they follow machines.

To balance the pulling forces on both sides of the chain, it is desirable that opposed sides of modules in the chain are pivotally joined to the opposed sides of neighbouring modules. However, the provision of pivotal connections on each side of adjacent modules imposes a restriction on the ease of loading and removal of cables and hoses into and from the chain.

WO 2004/106773 discloses an arrangement whereby individual modules are constructed in the form of first and second opposed housing shells that are separable to allow loading and removal of cables and hoses into and from a hollow interior defined within the housing shells. First and second transmission members are connected to opposed side walls of each module, the first and second transmission members each being adapted for pivotal connection to respective first and second transmission members of adjacent modules.

This arrangement requires the use of pivot pins to pivotally connect the transmission members and allow relative pivotal movement of adjacent modules. The use of such a pivot pin means there is minimal free play in the event that adjacent modules are rotated relative to each other. Consequently in the event a haulage chain constructed from a series of such modules is subjected to twisting forces, the transmission members are prone to bend and deform. Once the transmission members are damaged in this manner, they must be replaced in order to permit effective operation of the haulage chain in enabling cables and hoses to be pulled behind a mobile machine.

The modules of other known haulage chains, such as those disclosed in WO 01/29448 and U.S. Pat. No. 6,029,437, are constructed to include projections permitting pivotal interconnection of adjacent modules by means of pivot pins that suffer similar problems to those outlined above.

According to an aspect of the invention there is provided a housing module for a haulage chain capable of hauling cables and hoses, the housing module comprising a pair of opposed housing members side wall portions of which abut to define opposed side walls extending between opposed first and second walls, the housing module including releasable retention members to retain the side wall portions of the housing members in abutment whilst allowing selective separation of the housing members to permit the loading and removal of cables and hoses into and out of a hollow interior bounded by the walls of the housing module, the side wall portions on each side of the housing module defining pockets openable on separation of the housing members to receive mutually interengaged endless links of a chain and thereby permit use of a pair of such chains to interconnect a succession of housing modules to define a haulage chain, the pockets being closeable and the chains being clampingly retained within the side walls of the housing modules on opposite sides of the haulage chain following closure of the respective pockets.

By mutually interengaged endless links of a chain, we mean a chain formed of endless links that pass through their neighbours in order to interengage and form the chain. Such links are typically formed as annular or ovaloid rings although other shapes are possible. In any event it is important that the pivot pins of the prior art are omitted.

The provision of pockets to receive mutually interengaged endless links of a chain means that pivot pins are not required to pivotally interconnect adjacent housing modules during formation of a haulage chain from a succession of the housing modules. This reduces the cost of manufacture of the haulage chain whilst increasing the speed of construction and increasing the tensile strength of the resultant haulage chain.

Relative movement about a pivot may be achieved by constructing the housing modules so that the pivotal connection is achieved through the interengaging connection between two adjacent links. This form of pivotal connection is less rigid than a pivot pin when subjected to twisting forces. Such twisting forces are therefore transmitted to the side walls of the housing module, which act to resist movement of the links received within the pockets. This, together with the resistance of such links to bending, means that the links are less prone to damage when a haulage chain constructed from housing modules according to the invention is subjected to twisting forces.

In order to house the links to control, in use, relative movement between adjacent housing modules, each of the side walls of the housing module is preferably formed to define a tapered nose profile and a tipped tail profile. The profiles are preferably shaped such that, in use, tip portions of the nose profiles of a trailing housing module abut tip portions of the tail profiles of a leading housing module, the tip portions being substantially coingdent with associated pivots defined by the chains and permitting relative pivotal movement of the housing modules.

This arrangement ensures that on each side of adjacent housing modules links of the respective chain can be clampingly retained within the pockets defined in the respective side wall portions except at the point of interengagement between neighbouring links, which is required to provide relative pivotal movement between the housing modules.

The formation of tapered nose profiles permits, in use, relative pivotal movement between two adjacent housing modules. During such use, the abutment of tip portions of the tapered nose profiles of a trailing housing module against the tip portions of the tail profiles of a leading housing module at points substantially coingdent with associated pivots defined by the chains ensures that the tips remain in contact during relative pivotal movement of the adjacent housing modules about the associated pivots. This in turn assists in balancing any turning moments that might be created about each of the associated pivots on contact between the respective nose and tail profiles at points spaced from the associated pivot on relative pivotal movement of the housing modules.

According to another aspect of the invention there is provided a housing module for a haulage chain capable of handling cables and hoses, the housing module comprising a pair of opposed side walls extending between opposed first and second walls, the housing module including releasable retention members to retain the side wall portions of the housing members in abutment whilst allowing selective separation of the housing members to permit the loading and removal of cables and hoses into and out of a hollow interior bounded by the walls of the housing module, the side wall portions of the housing module defining pockets openable on separation of the housing members to receive links interlinked to define a chain and thereby permit the use of a pair of such chains to interconnect a succession of housing modules to define a haulage chain, the pockets being closeable and the chains being clampingly retained with the side walls of the housing module on opposite sides of the haulage chain following closure of the respective pockets, and each of the side walls defining a tapered nose profile and a tipped tail profile, the profiles being shaped such that, in use, tip portions of the nose profiles of a trailing housing module abuts tip portions of the tail profiles of a leading housing module, the tip portions being substantially coingdent with associated pivots defined by the chains and permitting relative pivotal movement of the housing modules.

In embodiments of the invention where the side walls are shaped to define tapered nose profiles, the flank surfaces of the tapered nose profiles preferably define reaction surfaces against which the respective tail profiles of a leading housing module abut during relative pivotal movement of the housing modules in either direction about the associated pivots.

This engagement assists in resisting the creation of turning moments about the associated pivots on relative pivotal movement of adjacent housing modules.

Preferably the rake of the flank surfaces is chosen to limit the extent to which leading and trailing housing modules are pivotal relative to each other in either direction about the associated pivots.

The abutment surfaces of the side wall portions of the housing members of the housing module are preferably shaped such that on abutment of the side wall portions the resultant joints are offset from the tip portions of the nose and tail profiles.

This arrangement ensures that, in use, the resultant joints in a trailing housing module are offset from the resultant joints in a leading housing module. This arrangement assists in ensuring that abutting contact between the tip portions of the trailing nose profiles and the leading tail profiles does not force undesirable separation of the housing members of the housing modules.

The resultant joints may be offset in opposite directions from the tip portions of the nose and tail profiles.

In preferred embodiments, the tip portions of the nose and tail profiles of each side wall are located on a centre line of the side wall.

In particularly preferred embodiments, the abutment surfaces of the side wall portions of the housing members are shaped to resist relative sliding movement of the housing members of the housing module in a longitudinal direction.

The retention members preferably include a pair of clamps, each clamp being arranged to releasably engage the housing members and clamp the side wall portions of the housing members together and thereby retain the side wall portions in abutment.

According to a yet further aspect of the invention there is provided a connector for connecting two lengths of a chain including mutually interengaged endless links forming the chain, the connector comprising a pair of opposed limbs spaced to receive end links of each length of chain therebetween such that each of a pair of connector pins inserted through a respective pair of aligned apertures in the limbs passes through the hollow interior of a respective link and thereby retains the link between the limbs.

Embodiments of the invention will now be described, by way of non-limiting examples, with reference to the accompanying drawings in which.

Figure 1:
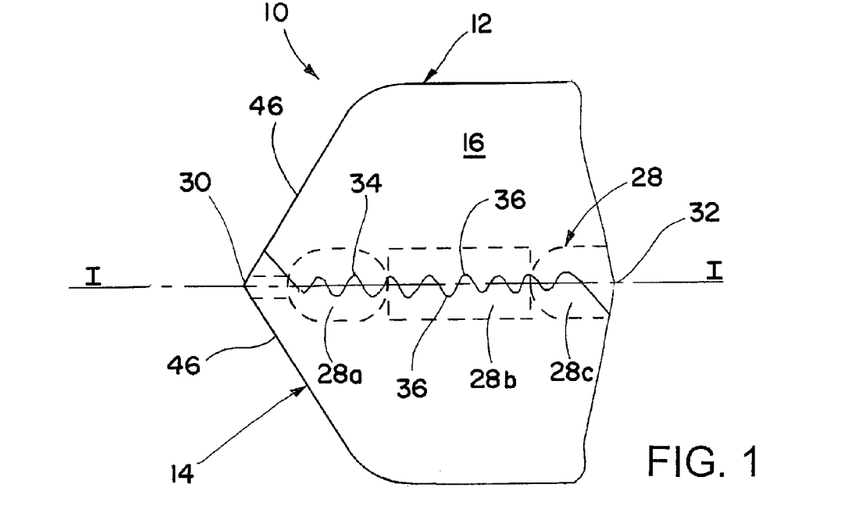
FIGS. 1 and 2 show a housing module according to an embodiment of the invention.

A housing module 10 according to an embodiment of the invention is shown in FIG. 1.

Figure 2:
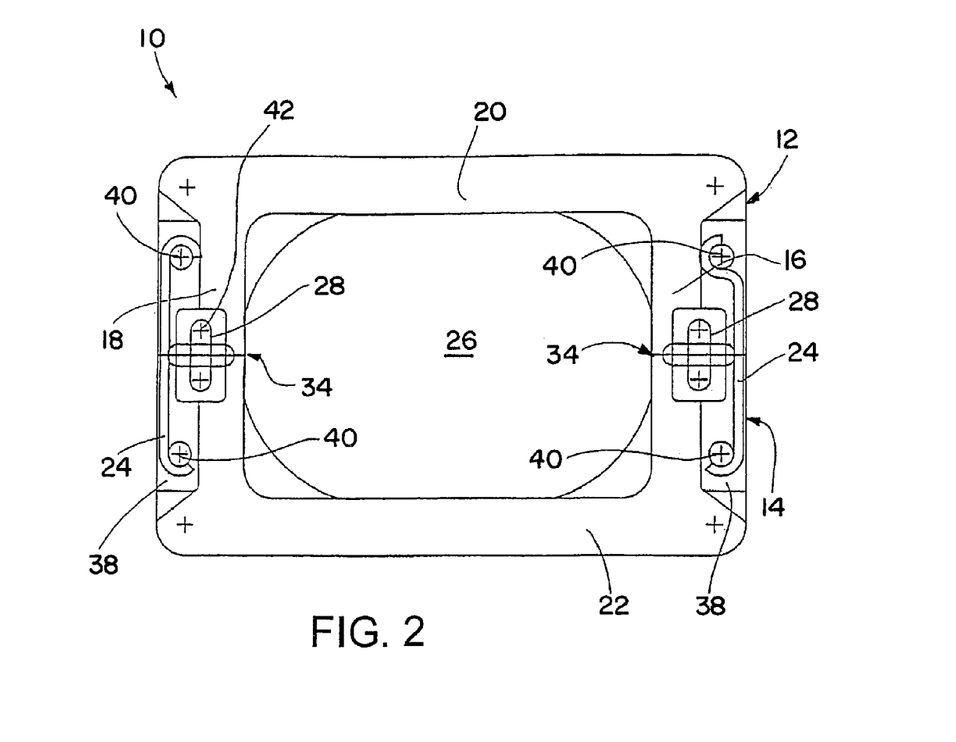

The module 10 includes opposed housing members 12,14, side wall portions of which abut to define opposed side walls 16,18 extending between opposed first and second walls 20,22, as shown in FIG. 2.

The housing member 10 also includes releasable retention members to retain the side wall portions of the housing members 12,14 in abutment whilst allowing selective separation of the housing members 12,14 to permit the loading and removal of cables and hoses into and out of the hollow interior 26 bounded by the walls 16,18,20,22 of the housing module 10.

Pockets 28 (shown in dashed lines in FIG. 1) are formed in the side wall portions, which are openable on separation of the side wall portions to receive links in the form of endless ovaloid rings interengaged to form a chain, as will be described later.

Each of the side walls 16,18 of the housing module is shaped to define a tapered nose portion having a tip 30 and a tail portion having a tip 32.

In the embodiment shown in FIGS. 1 and 2, the tips 30,32 of the nose and tail profiles of each side wall 16,18 are located on a centre line I-I of the side wall extending in the longitudinal direction of the housing module 10. Abutment surfaces of the side wall portions are formed such that the resultant joint 34 between the housing members 12,14 in each of the side walls 16,18 is offset in opposite directions from the centre line I-I at the nose and tail profiles.

In another embodiment, the abutment surfaces of the side wall portions may be formed such that the resultant joint 34 between the housing members 12,14 in each of the side walls 16,18 is offset in the same direction from the centre line I-I at the nose and tail profiles.

The abutment surfaces of the side wall portions are also shaped so as to form mutually engageable surfaces which interengage on abutment of the respective side wall portions to resist sliding movement of the housing members 12,14 relative to each other in a longitudinal direction.

In the embodiment shown in FIGS. 1 and 2, the abutment surfaces are shaped so as to form mutually engageable teeth 36 which interengage on abutment of the respective side wall portions. However in other embodiments it is envisaged that the mutually engageable surfaces may take other forms.

It is also envisaged in other embodiments that the tips 30,32 of the nose and tail profiles may be offset from the centre line I-I of each side wall 16,18. In such embodiments, the abutment surfaces of the side wall portions may be formed such that the resultant joint 34 between the housing members 12,14 in each of the side walls 16,18 is offset from the tip portions 30,32 of the nose and tail profiles either in the same direction or in opposite directions.

In the embodiment shown in FIGS. 1 and 2, the retention members include a pair of clamps 24 received within recesses 38 formed in the side walls 16,18 of the housing module 10. Each clamp 24 snap-fittingly engages a pair of spaced bars 40 extending across a respective one of the recesses 38, each of the bars 40 being secured to a respective side wall portion such that the clamp 24, when engaged, maintains the side wall portions in abutment.

The clamps 24 shown in FIG. 2 include an S-shaped clamp located in the recess 38 formed in one of the side walls 16 and a C-shaped clamp located in the recess 38 formed in the other of the side walls 18.

Figure 3:
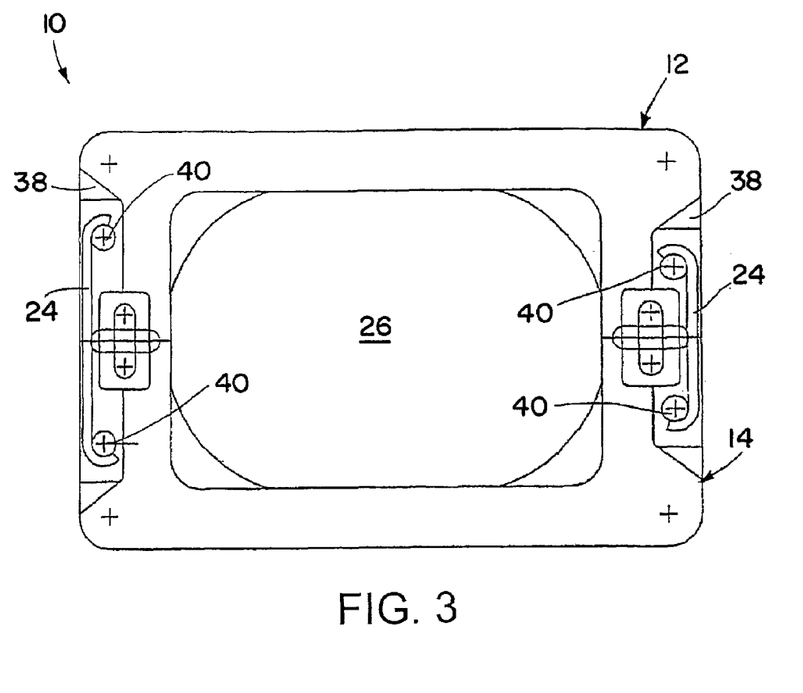
FIGS. 3 and 4 show cross-sectional views of housing modules according to other embodiments of the invention.
Figure 4:
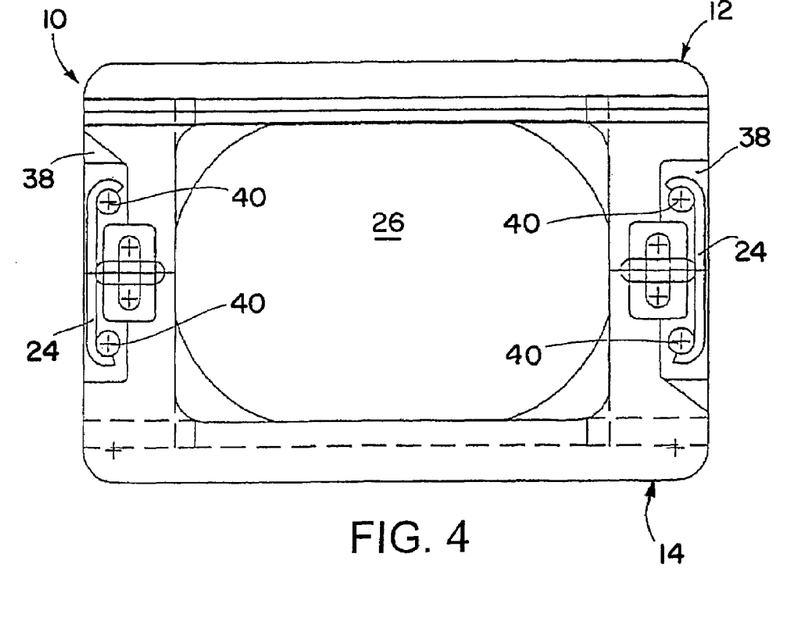

It is envisaged that, in other embodiments, other combinations of clamps may be used. For example two S-shaped clamps or two C-shaped clamps, as illustrated in FIGS. 3 and 4, may be used. In embodiments where two C-shaped clamps are used, the clamps may differ in size (FIG. 3) or may be the same size as each other (FIG. 4).

Figure 5:
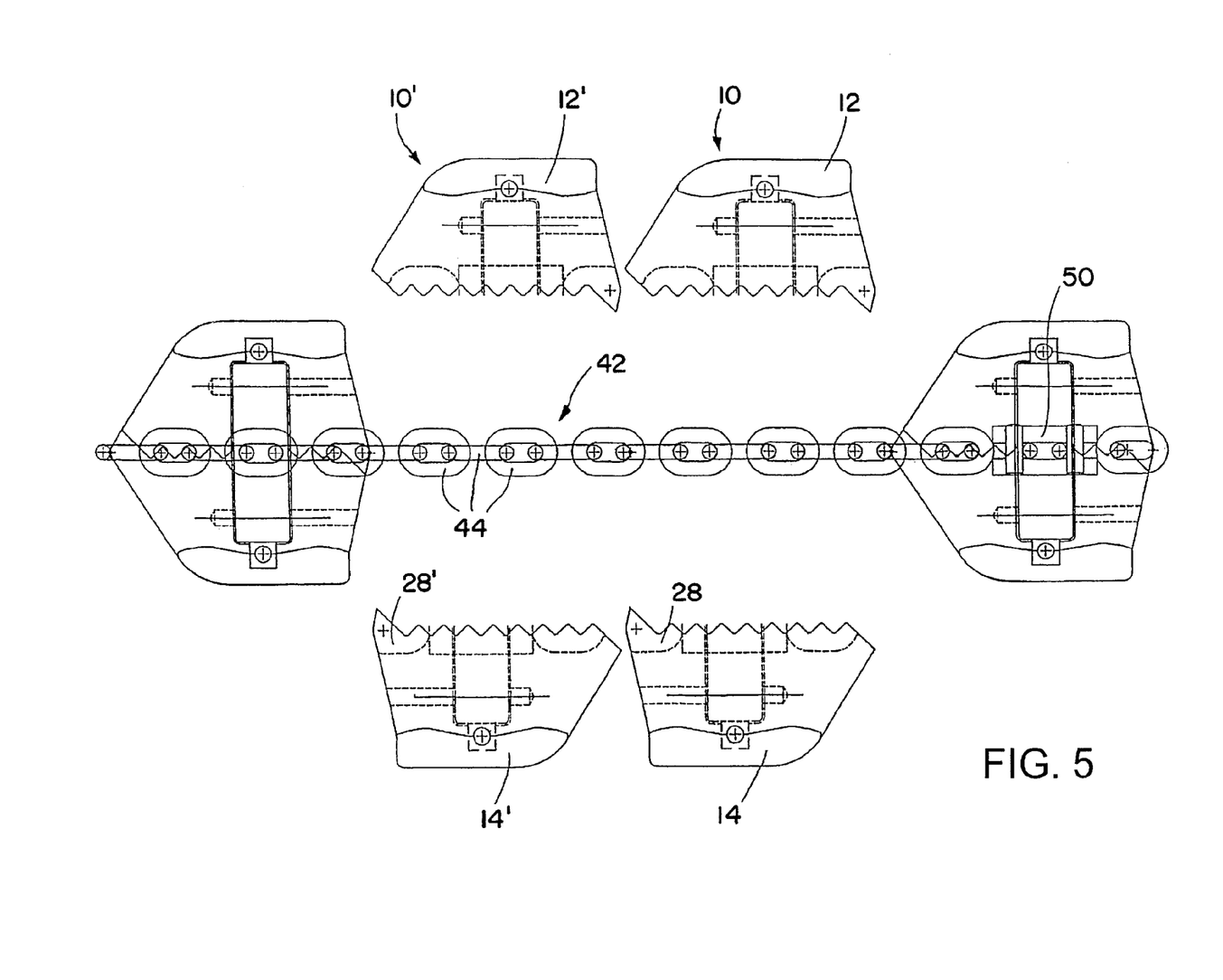
FIG. 5 illustrates construction of a haulage chain using the housing module of FIGS. 1 and 2.

During construction of a haulage chain, the clamps 24 are released to allow separation of the housing members 12,14 of the housing module 10, as shown in FIG. 5. This separation opens the pockets 28 defined in the side wall portions of the housing members 12,14.

While the pockets 28 are open chains 42 including a plurality of links 44 in the form of endless ovaloid rings interengaged to form the chains are arranged so that a series of links 44 of each chain 42 is received within open pockets 28 in a respective side wall portion of one of the housing members 14.

The other housing member 12 is then positioned so as to align the side wall portions of the housing members 12, 14 and bring the side wall portions into abutment so as to close the pockets 28. The clamps 24 are then re-engaged to maintain the side wall portions in abutment and the series of links 44 of each chain 42 are thereby clampingly retained within the pockets 28 defined in the side wall portions of respective side walls 16,18 of the housing members 12,14.

The clamps 24' of an adjacent housing module 10' are then released to allow separation of the housing members 12',14' of that housing module 10'. The procedure outlined above is then repeated so that an adjacent series of links 44 in each chain 42 is clampingly retained within the pockets 28' defined in the side wall portions of respective side walls 16',18' of the housing members 12',14' of the adjacent housing module 10'.

Figures 6, 7:
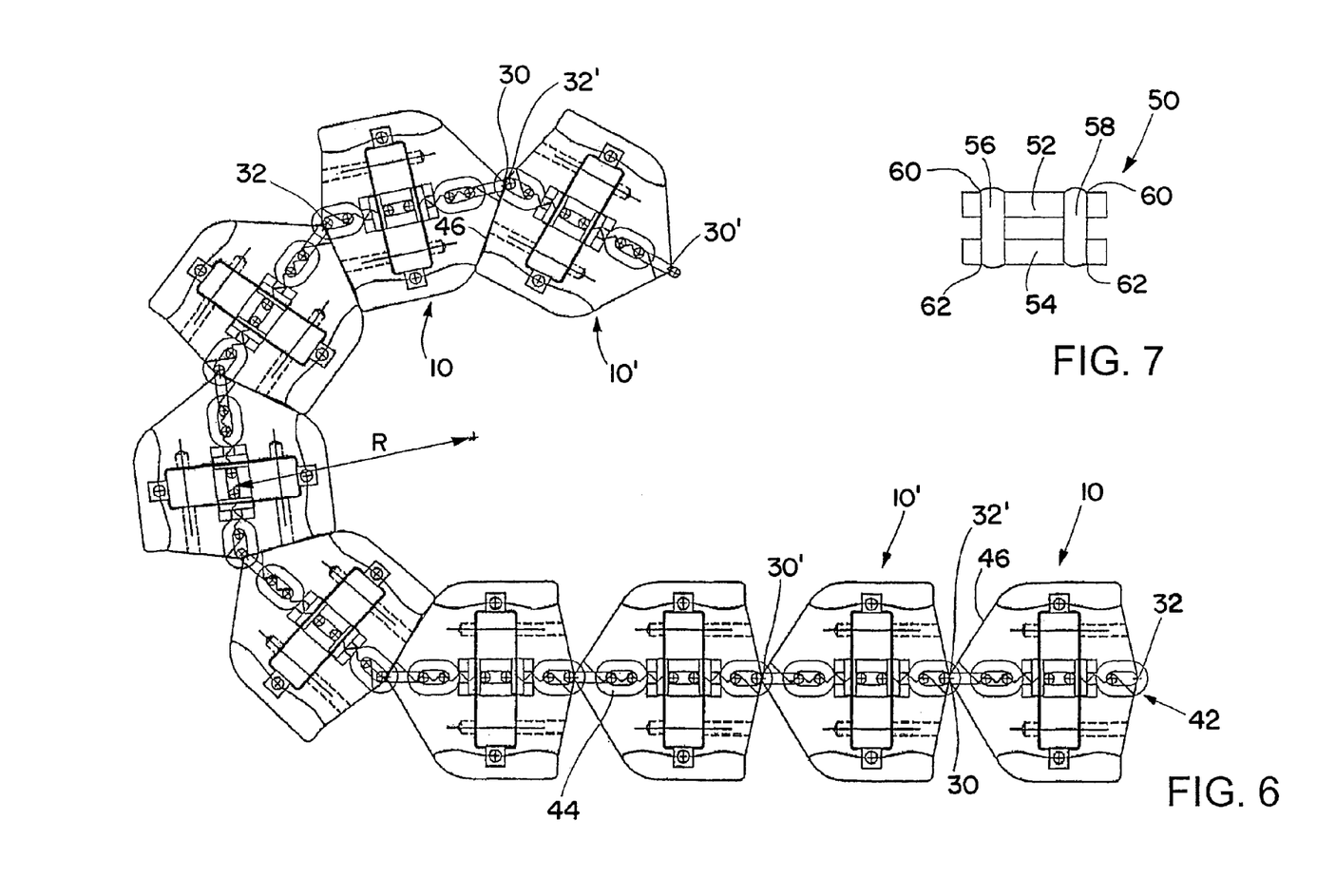
FIG. 6 shows a haulage chain constructed using the housing module of FIGS. 1 and 2.
FIG. 7 shows a connector according to another aspect of the invention.

In this manner the housing modules 10,10' are interconnected such that the tips 30 of the nose profiles of the trailing housing module 10 abut the tips 32 of the tail profiles of the leading housing module 10', as illustrated in FIG. 6.

Repetition of the steps outlined above with successive housing modules 10 allows a haulage chain to be constructed, as shown in FIG. 6.

The relative dimensions of the links 44 of the chains 42, the pockets 28,28' and the nose and tail profiles are chosen such that each series of links 44 in each chain 42 is clampingly retained within the respective pockets 28,28' defined in the respective side wall portions except at the point of interengagement between the end links of each series of links 44, which is required to provide relative pivotal movement between the housing modules.

This manner of pivotally connecting adjacent housing modules 10,10' reduces the amount of time required to construct a haulage chain when compared to the use of modules requiring the use of pivot pins, and also reduces the cost of manufacture and construction.

The provision of tapered nose profiles on the trailing housing module 10 permits relative pivotal movement between the adjacent housing modules 10,10', as illustrated in FIG. 6. Such pivotal movement would of course not be possible if the adjacent nose and tail profiles were flat.

The tips 30 of the nose profiles of the trailing housing module 10 and the tips 32 of the tail profiles of the leading housing module 10' are substantially coingdent with the pivotal connections defined by the chains 42. This ensures that during relative pivotal movement of the housing modules 10,10' the tips 30,32 remain in contact.

As shown in FIG. 6, flank surfaces 46 of the nose profiles of the trailing housing module 10 define reaction surfaces against which the tail profiles of the leading housing module 10' abut during relative pivotal movement of the housing modules 10,10' about the pivotal connections defined by the chains 42.

This engagement, in combination with the alignment of the continuing abutment between the tip 30 of the nose profile of the trailing housing module 10 and the tip 32 of the tail profile of the leading housing module 10 with the pivotal connections, ensures that no turning moments are created about the pivotal connections.

It is also apparent from FIG. 6 that the rake of the flank surfaces 46 determines the extent to which the housing modules 10,10' are pivotal relative to each other about the pivotal connections. The extent to which the housing modules 10,10' may pivot relative to each other determines the radius R of the circle defined when the haulage chain turns over on itself, as illustrated in FIG. 6

In other embodiments it is envisaged that the rake of the flank surfaces 46 of the nose and/or tail profiles of the housing module 10 may be increased or decreased so as to reduce or increase the effective radius R depending on the circumstances in which the haulage chain is intended to be used.

The offset of the resultant joints 34,34' between the housing members of the trailing and leading housing modules 10,10' means that the tips 30 of the nose profiles of the trailing housing module 10 are offset from the resultant joints 34' between the housing members 12',14' of the leading housing module 10'. Consequently the tips 30 of the nose profiles of the trailing housing module 10 cannot force undesirable separation of the housing members 12',14' of the leading housing module 10' and vice versa.

In order to increase the length of a haulage chain beyond the length of the individual lengths of chain 42, a connector 50 according to another aspect of the invention (FIG. 7) may be used to interconnect the ends of adjacent lengths of chain 42.

The connector 50 shown in FIG. 7 includes a pair of opposed limbs 52,54 and a pair of connector pins 56,58 that are insertable through respective pairs of aligned apertures 60,62 in the limbs 52,54.

In order to interconnect the ends of adjacent lengths of chain 42, an end links 44 of each length of chain 42 is inserted between respective ends of the spaced limbs 52,54.

The connector pins 56,58 are then inserted through the respective pairs of aligned apertures 60,62 in the limbs 52,54 such that each of the connector pins 56,58 passes through hollow interior of a respective link 44 and thereby retains the link 44 between the limbs 52,54.

Each of the connector pins 56,58 is held in position within the respective pairs of aligned apertures 60,62.

Figure 9:
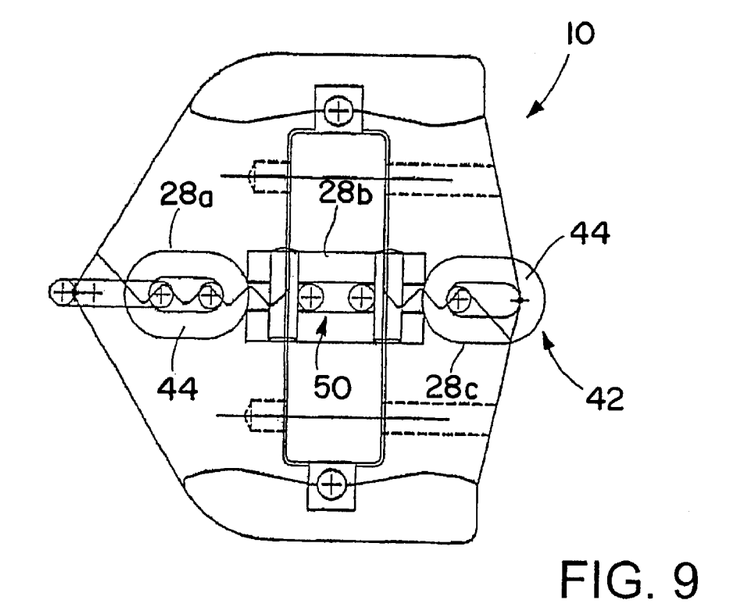

In the embodiment shown in FIG. 1, the pockets 28 of the housing module 10 shown in FIG. 1 define a central pocket 28*b* located between two outer pockets 28*a*,28*c*. The central pocket 28*b* is shaped to receive the connector 50. Consequently, in circumstances where the series of endless links 44 of the chains 42 to be clampingly retained within the pockets 28 of the side walls 16,18 of a housing module 10 include connectors 50, the connectors 50 are received within the central pockets 28*b* and the adjacent endless links 44 of the chains 42 are received in the outer pockets 28*a*,28*c*, as shown in FIG. 9.

Figure 8:
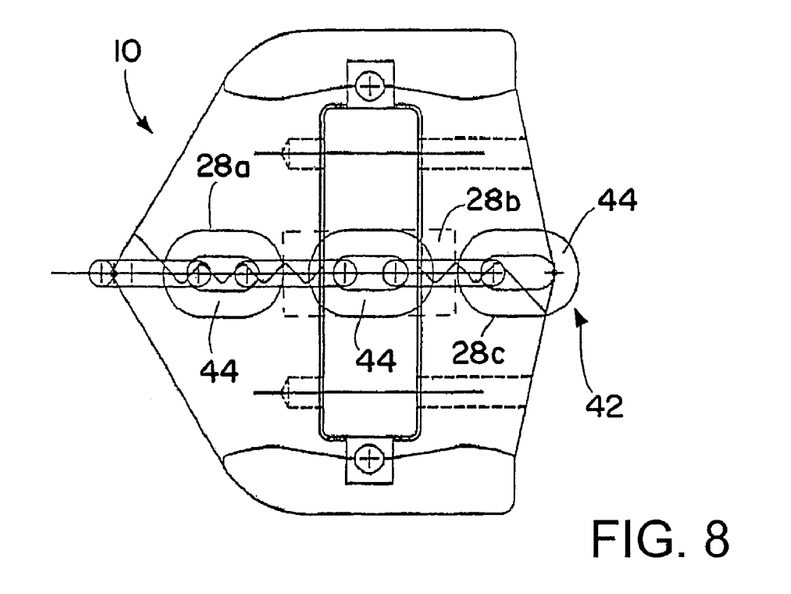
FIGS. 8 and 9 show the housing module of FIGS. 1 and 2 in use.

In other circumstances, where the series of endless links 44 of the chains 42 do not include connectors 50, endless links 44 are received within the central pockets 28*b* as well as the outer pockets 28*a*,28*c*, as shown in FIG. 8.

The provision of the outer pockets 28*a*,28*c* means that the connector 50 is not required to have the same shape as each of the endless links 44. This is because clampingly retaining the adjacent links 44 within the outer pockets 28*a*,28*c* effectively retains a link 44 within the central pocket 28*b*. It is important to ensure only that the connector 50 defines the same spacing between adjacent pivotal interengagement as the links 44 of the chains 42.

The use of such a connector 50 is advantageous in that other previously known connectors for connecting adjacent lengths of chain are bulky and cumbersome, and cannot therefore be housed within pockets 28 in the side wall portions of the housing members 12,14 of a housing module 10.

In other embodiments, it is envisaged that the tips 32 of the nose profiles of the housing module 10 may be omitted and the nose profiles may be shaped so as to define a relatively flat surface. In such embodiments, the tips 30 of the tail profiles of a trailing housing module 10 would preferably continue to abut the tail profiles of a leading housing module 10' at a point substantially coingdent with the pivotal connections defined by the chains 42.

In yet further embodiments, it is envisaged that the endless links 44 of the chains 42 may be formed from different shapes. For example, the endless links 44 may be formed as annular rings, square or rectangular members or any other geometrically shaped member provided the interior is hollow to allow interengagement of adjacent endless links.

It is also envisaged that in other embodiments, the chains 42 may be replaced with chains formed from links interlinked by means of alternative pivotal connections, such as pivot pins or rivets. In such embodiments abutting engagement between the tips 30 of the nose profiles or a trailing housing module 10 and the tips 32 of the tail profiles of a leading housing module 10' at a point substantially coingdent with pivotal connections defined by the chains would continue to provide the benefits outlined above in terms of reducing the risk of turning moments being created about the pivotal connections.

The invention claimed is:

1. A haulage chain capable of hauling cables and hoses comprising a housing module and a pair of chains having mutually interengaged endless links having associated pivots, the housing module comprising a pair of opposed housing members side wall portions of which abut to define opposed side walls extending between opposed first and second walls, the housing module including releasable retention members to retain the side wall portions of the housing members in abutment whilst allowing selective separation of the housing members to permit the loading and removal of cables and hoses into and out of a hollow interior bounded by the walls of the housing module, the side wall portions on each side of the housing module defining pockets openable on separation of the housing members to receive mutually interengaged endless links of the chains, respectively, for interconnecting a succession of housing modules to define a haulage chain, the pockets being closeable and the chains being clampingly retained within the side walls of the housing modules on opposite sides of the haulage chain following closure of the respective pockets.

2. A haulage chain according to claim 1 wherein each of the side walls of the housing module is formed to define a tapered nose profile having a tip portion and a tipped tail profile having a tip portion, the profiles being shaped such that, in use, the tip portion of the nose profile of a trailing housing module abuts tip portion of the tail profile of a leading housing module, the tip portions being substantially coincident with associated pivots defined by the chains and permitting relative pivotal movement of the housing modules.

3. A haulage chain according to claim 2 wherein, in use, flank surfaces of each of the tapered nose profiles define reaction surfaces against which the respective tail profiles of a leading housing module abut during relative pivotal movement of the housing modules in either direction about the associated pivots.

4. A haulage chain according to claim 3 wherein the rake of the flank surfaces of the tapered nose profiles is chosen to limit, in use, the extent to which leading and trailing housing modules are pivotal relative to each other in either direction about the associated pivots.

5. A haulage chain according to any of claim 2 wherein the side wall portions have abutment surfaces that are shaped such that abutment of the side wall portions form resultant joints that are offset from the tip portions of the nose and tail profiles.

6. A haulage chain according to claim 5 wherein the resultant joints are offset in opposite directions from the tip portions of the nose and tail profiles.

7. A haulage chain according to claim 6 wherein the tip portions of the nose and tail profiles of each side wall are located on a centre line of the side wall.

8. A haulage chain according to claim 5 wherein the tip portions of the nose and tail profiles of each side wall are located on a centre line of the side wall.

9. A haulage chain according to claim 1 wherein the side wall portions of the housing members have abutment surfaces that are shaped to resist relative sliding movement of the housing members of the housing module in a longitudinal direction.

10. A haulage chain according to claim 1 wherein the retention members include a pair of clamps, each clamp being arranged to releasably engage the housing members and clamp the side wall portions of the housing members together and thereby retain the side wall portions in abutment.

11. A haulage chain capable of hauling cables and hoses comprising a housing module for a haulage chain capable of hauling cables and hoses and a pair of chains having interlinked links having associated pivots, the housing module comprising a pair of opposed side walls extending between opposed first and second walls, the housing module including releasable retention members to retain the side wall portions of the housing members in abutment whilst allowing selective separation of the housing members to permit the loading and removal of cables and hoses into and out of a hollow interior bounded by the walls of the housing module, the side wall portions of the housing module defining pockets openable on separation of the housing members to receive links of the chains, respectively, for interconnecting a succession of housing modules to define a haulage chain, the pockets being closeable and the chains being clampingly retained with the side walls of the housing module on opposite sides of the haulage chain following closure of the respective pockets, and each of the side walls defining a tapered nose profile having a tip portion and a tipped tail profile having a tip portion, the profiles being shaped such that, in use, the tip portion of the nose profile of a trailing housing module abuts tip portion of the tail profile of a leading housing module, the tip portions being substantially coincident with the associated pivots defined by the chains and permitting relative pivotal movement of the housing modules.

12. A haulage chain according to claim 11 wherein the tapered nose profile has flank surfaces, and in use, the flank surfaces of each of the tapered nose profile defines a reaction surface against which the tail profile of a leading housing module abuts during relative pivotal movement of adjacent housing modules in either direction about the associated pivots.

13. A haulage chain according to claim 12 wherein the flank surfaces have a rake, and the rake of the flank surfaces of the tapered nose profile is chosen to limit, in use, the extent to which the leading housing module and trailing housing module are pivotal relative to each other in either direction about the associated pivots.

14. A haulage chain according to claim 3 wherein the side wall portions have abutment surfaces that are shaped such that abutment of the side wall portions form resultant joints that are offset from the tip portions of the nose and tail profiles.

15. A haulage chain according to claim 14 wherein the resultant joints are offset in opposite directions from the tip portions of the nose and tail profiles.

16. A haulage chain according to claim 15 wherein the tip portions of the nose and tail profiles of each side wall are located on a centre line of the side wall.

17. A haulage chain according to claim 14 wherein the tip portions of the nose and tail profiles of each side wall are located on a centre line of the side wall.

18. A haulage chain according to claim 3 wherein the side wall portions of the housing portions have abutment surfaces that are shaped to resist relative sliding movement of the housing members of the housing module in a longitudinal direction.

19. A haulage chain according to claim 3 wherein the retention members include a pair of clamps, each clamp being arranged to releasably engage the housing members and clamp the side wall portions of the housing members together and thereby retain the side wall portions in abutment.

* * * * *

UNITED STATES PATENT AND TRADEMARK OFFICE
CERTIFICATE OF CORRECTION

PATENT NO.       : 7,610,744 B2                                                Page 1 of 1
APPLICATION NO.  : 12/101507
DATED            : November 3, 2009
INVENTOR(S)      : Anthony John Hart It is certified that error appears in the above-identified patent and that said Letters Patent is hereby corrected as shown below:

Title Page the following should appear:
        (30) Foreign Application Priority Data
        Apr. 12, 2007        (GB) 0707021.2

Signed and Sealed this

Twenty-first Day of September, 2010

David J. Kappos
*Director of the United States Patent and Trademark Office*